Figures 1, 12:
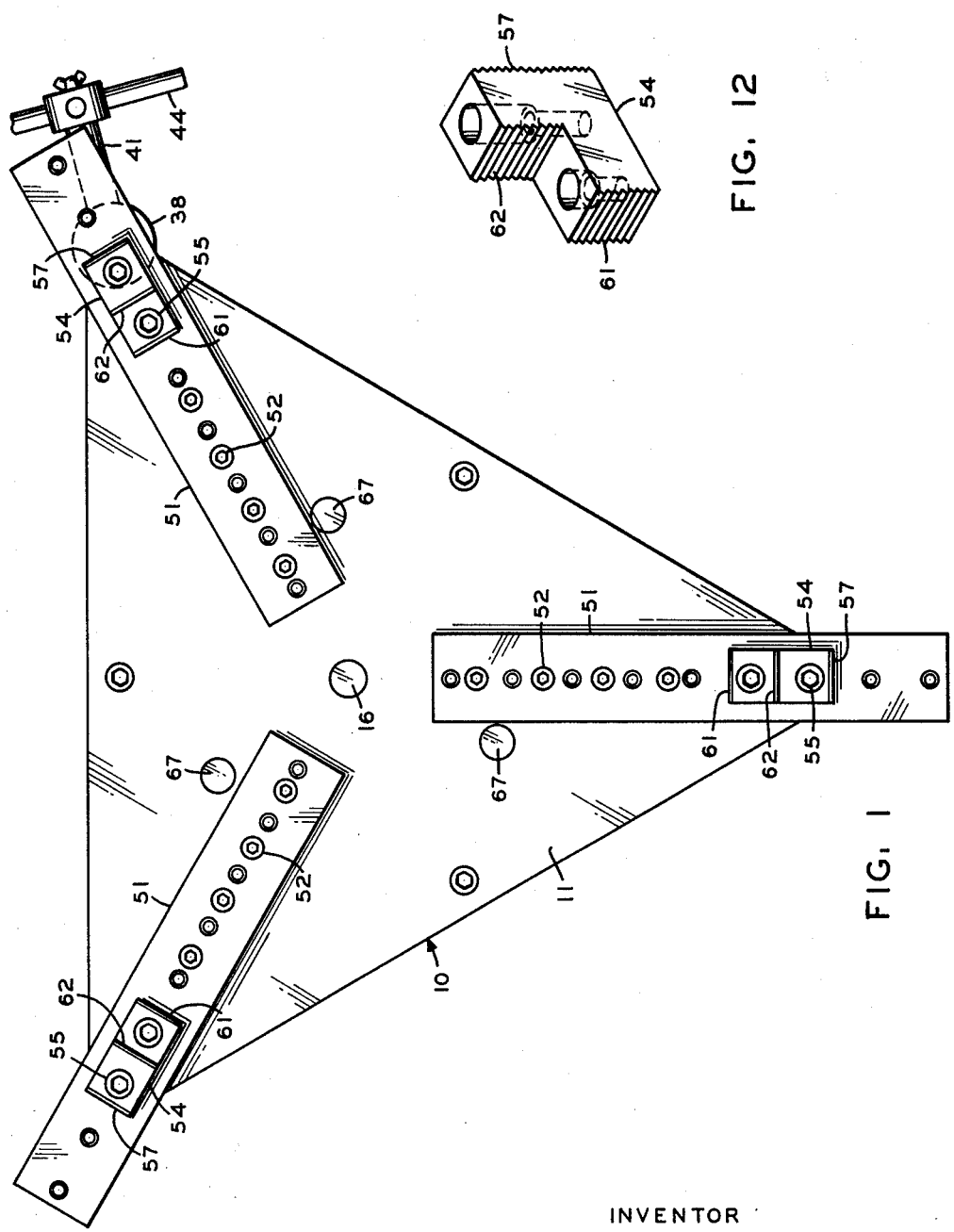

Nov. 10, 1964  P. P. WUESTHOFF  3,156,480
SELF-CENTERING CHUCK MECHANISM
Filed Nov. 19, 1962  4 Sheets-Sheet 1

INVENTOR
PAUL P. WUESTHOFF
BY Cohn and Powell
ATTORNEYS

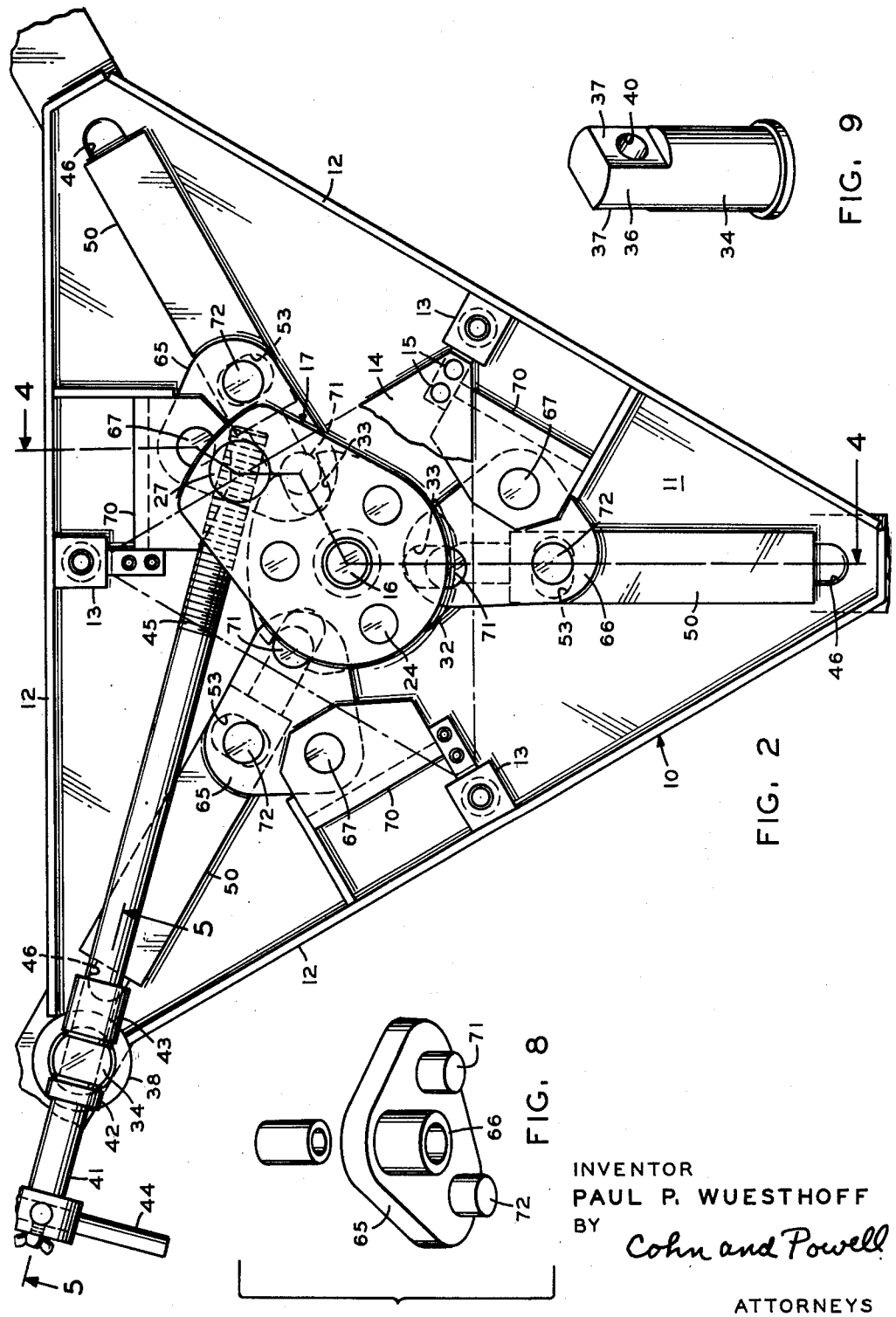

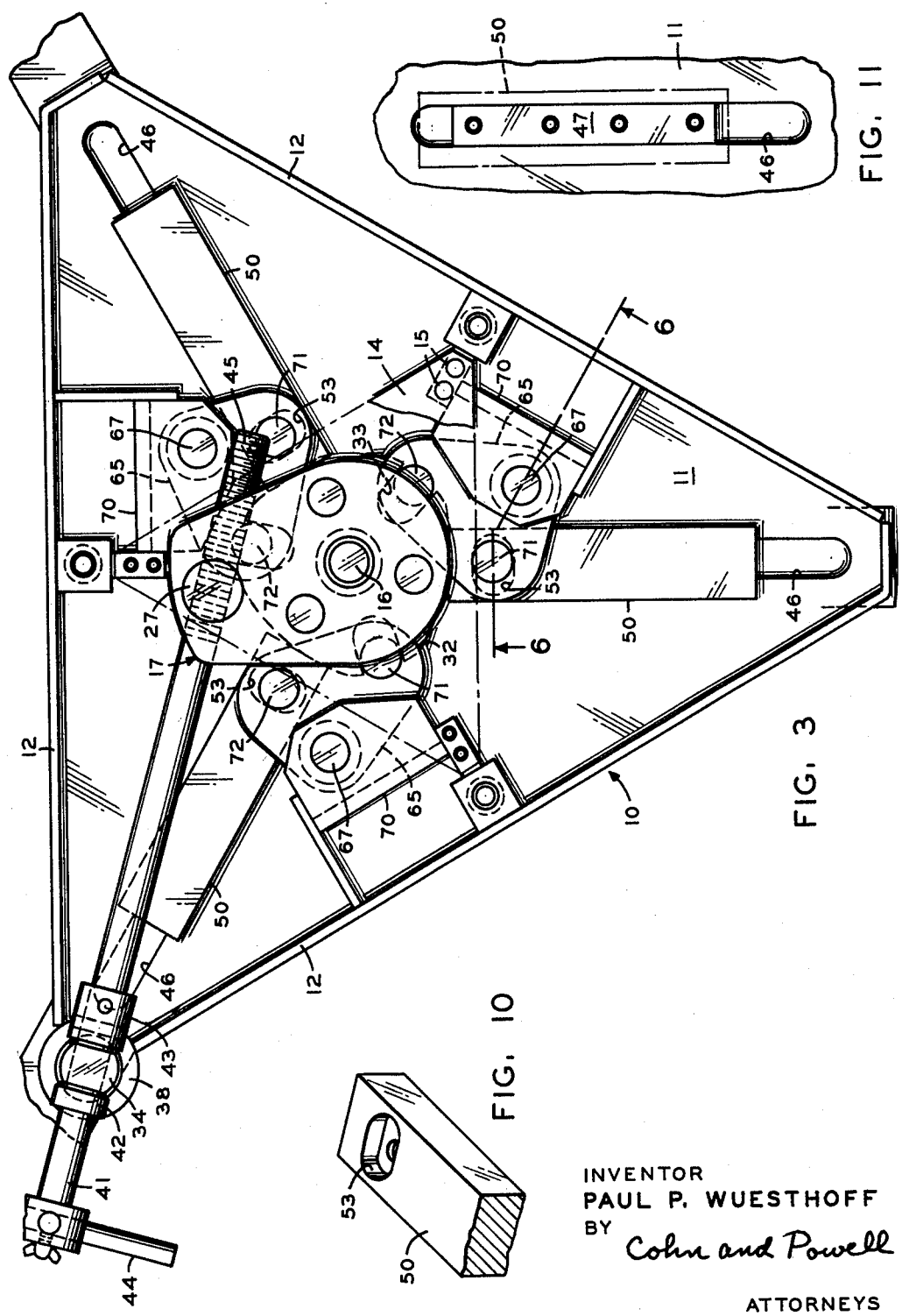

Nov. 10, 1964     P. P. WUESTHOFF     3,156,480
SELF-CENTERING CHUCK MECHANISM
Filed Nov. 19, 1962                        4 Sheets-Sheet 4

INVENTOR
PAUL P. WUESTHOFF
BY
*Cohn and Powell*
ATTORNEYS

United States Patent Office 3,156,480
Patented Nov. 10, 1964

3,156,480
SELF-CENTERING CHUCK MECHANISM
Paul P. Wuesthoff, St. Louis, Mo., assignor to The Pandjiris Weldment Company, St. Louis, Mo., a corporation of Missouri
Filed Nov. 19, 1962, Ser. No. 238,399
7 Claims. (Cl. 279—119)

This invention relates generally to improvements in a self-centering chuck mechanism, and more particularly to a three-jaw chuck adapted to hold and position a workpiece during welding operations.

It is an important objective to provide an improved mechanism for adjusting the linear position of a plurality of chuck jaws so that such jaws will exert pressure on either the external or internal surfaces of a cylindrical tank wall incident to holding the tank in the chuck and to maintaining a seam for welding.

Other important advantages are realized by constructing the component parts of the jaw-adjusting mechanism so that the jaws are capable of exerting tremendous pressures on the tank wall with only a minimum of manual effort, the transmittal of pressures being accomplished with the highest degree of efficiency.

An important object is achieved by the provision of a rotatively mounted camming means that is operatively interconnected to a plurality of reciprocatively mounted jaws whereby upon turning the camming means the linear position of the jaws is accurately and quickly determined either toward or away from a common axis.

Another important objective is afforded by the structural arrangement of the manually-operated means for turning a fulcrum member drivingly attached to a wheel that in turn actuates the jaw-positioning means. Specifically, a nut rotatively mounted on the fulcrum member is threadedly connected to a shaft whereby the nut travels along the shaft upon shaft rotation and turns the fulcrum member and the wheel about the axis.

Still another important object is realized in that the shaft is also mounted on a rotative bearing fixed to the frame, the bearing allowing the shaft end to which the nut is threadedly attached to swing in an arc as the fulcrum member is turned upon manipulation of the threaded shaft.

An important objective is provided by an improved structure interconnecting the rotatively mounted member with the movable jaws. For example, a wheel is mounted on the axis which has at least one recess adapted to receive a follower of a pivotally mounted cam plate, the cam plate being operatively connected to a jaw whereby the wheel upon rotation will pivot the cam plate and consequently adjust the linear position of the jaw.

Another important object is afforded by the particular structural arrangement and connection of the pivoted cam plate with a reciprocatively mounted bar means to which the jaw is secured, whereby the plate upon turning about its axis causes linear adjustment of the bar. To obtain this advantageous functional result, the bar is provided with a transverse slot that receives a follower of the cam plate, the follower moving relatively transversely to the bar in such slot while urging the bar in either linear direction.

Yet another important object is achieved by the provision of a common pin on which is mounted a fulcrum member and a wheel member interconnected by a plurality of projections from one of such members, the wheel member having a plurality of circumferentially spaced recesses, and a plurality of pivotally mounted cam plates each having a pair of followers one of which is fitted and received in one of the wheel recesses and the other of which is fitted and received in a transverse slot provided in a reciprocatively mounted jaw bar, the fulcrum and wheel members being rotatable to adjust the linear position of the jaws through the cooperating cam plates and bars.

Another important objective is to provide a self-centering three-jaw chuck that is simple and durable in construction, economical to manufacture and assemble, highly efficient in operation, and which is fully automatic and capable of use by any one with little or no instructions.

Figure 5:
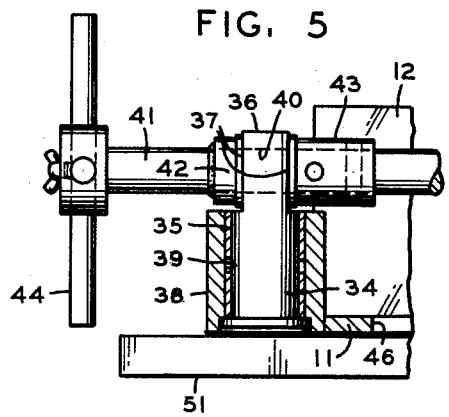
Figure 7:
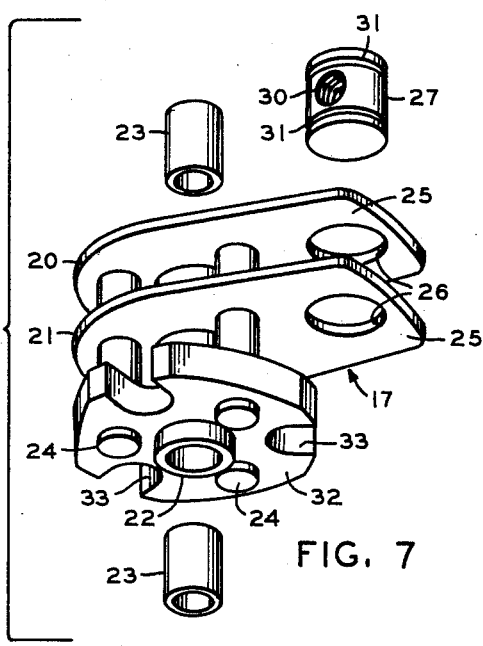
Figure 6:
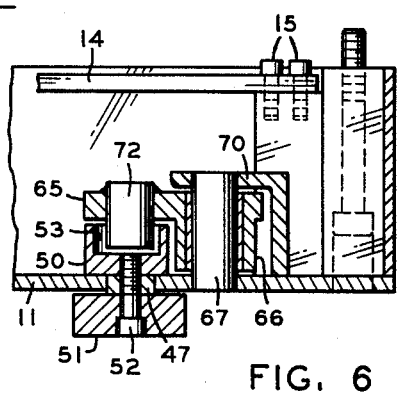
Figure 4:
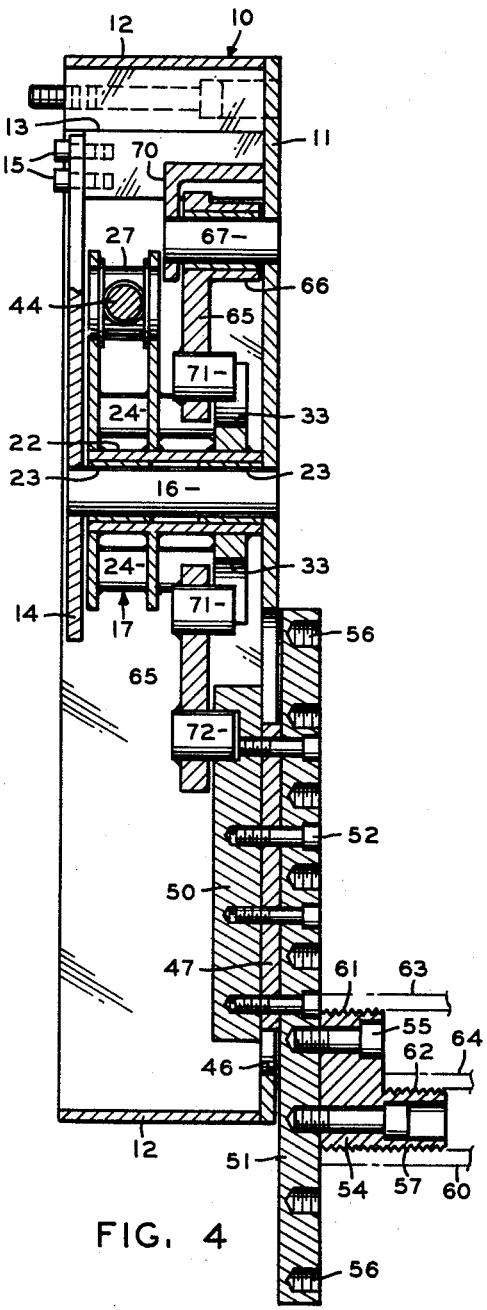

The foregoing and numerous other objects and advantages of the invention will more clearly appear from the following detailed description of a preferred embodiment, particularly when considered in connection with the accompanying drawings, in which:

FIG. 1 is a top plan view of the chuck;
FIG. 2 is a bottom plan view of the chuck mechanism;
FIG. 3 is a bottom plan view of the chuck mechanism showing the jaws adjusted to a different linear position from that shown in FIG. 2;
FIG. 4 is a cross sectional view as seen along staggered line 4—4 of FIG. 2;
FIG. 5 is a fragmentary, cross sectional view as seen along line 5—5 of FIG. 2;
FIG. 6 is a fragmentary, cross sectional view as seen along staggered line 6—6 of FIG. 3;
FIG. 7 is an exploded perspective view of the fulcrum member and wheel member together with the sleeve bearings and rotative nut;
FIG. 8 is a perspective view of a cam plate;
FIG. 9 is a perspective view of the bearing for mounting the shaft;
FIG. 10 is a fragmentary perspective view of a bar end;
FIG. 11 is a top plan view showing the assembly of a bar to the top plate of the frame, and
FIG. 12 is a perspective view of a clamping jaw.

Referring now by characters of reference to the drawings, said first to FIG. 4, it is seen that the device includes a substantially triangular frame generally indicated at 10 that includes a top plate 11 and depending side aprons 12. Secured to the intermediate portion of each side apron 12 is an inwardly extending bracket 13. A triangular bottom plate 14 is secured to the brackets 13 by a plurality of screws 15.

Fixed to and extending between the top plate 11 and bottom plate 14 is a pin 16 that defines a common center axis. Rotatively mounted on the pin 16 is a fulcrum member generally indicated at 17, the structure of which is perhaps best illustrated in FIGS. 4 and 7. It will be seen that the fulcrum member 17 includes a pair of spaced plates 20 and 21 interconnected by a tubular sleeve 22, the sleeve 22 extending outwardly for a distance beyond the one plate 21. The sleeve 22 is rotatively mounted on the pin 16. A pair of sleeve bearings 23 are disposed between the sleeve 22 and the pin 16, one bearing being located at each end of the sleeve 22.

Furthermore, the spaced plates 20 and 21 are interconnected by a plurality (a total of three in the embodiment shown) of cylindrical projections 24 that extend between the plates 20 and 21 and extend laterally outwardly for a distance beyond the one plate 21.

Each of the plates 20 and 21 is provided with an extension portion 25 at one side which is provided with a circular aperture 26. Disposed within the aligned apertures 26 and rotatively mounted by the extension portions 25 is a cylindrical nut 27 having a threaded bore 30 therethrough. The nut 27 is provided with an annular groove 31 at each side of the bore 30 that is adapted to receive the plate portion defining the circular aperture 26, thereby fixing the nut 27 to the fulcrum member 17 yet allowing the nut 27 to pivot freely.

Also pivotally mounted on pin 16 is a wheel 32 constituting a rotative member. Specifically, the wheel 32 is provided with a central opening through which the sleeve 22 extends. Preferably, the wheel 32 is fastened to sleeve 22 so as to be driven thereby in a manner which will be described later. In addition, the wheel 32 is provided with a plurality (a total of three in the embodiment illustrated) of circular openings through which the projections 24 extend. The wheel 32 is held in spaced relation to the fulcrum member 17, and in particular is held in spaced relation to the plate 21. Upon rotation of the fulcrum member 17, the sleeve 22, together with the projections 24 serve to drive or rotate the wheel 32 in the same direction.

Formed in the periphery of wheel 32 in circumferentially spaced relation are a plurality (a total of three in the embodiment illustrated) of radially extending recesses 33 extending inwardly toward the pin 16 and the common axis. The purposes of recesses 33 will be later described.

Located at the apex of one of the corners of the triangular frame is a substantially cylindrical post 38 depending from and attached to the top plate 11 as is best seen in FIGS. 2 and 5, the post 38 being provided with a bore 39 therethrough. Rotatively mounted in the post bore 39 is a pin 34. To provide a bearing surface, a pair of tubular sleeves 35 of suitable material are disposed in the bore 39 between the post 38 and the pin 34.

From FIGS. 5 and 9, it is seen that the pin 34 includes a reduced end portion 36 having flat sides 37 through which is provided a circular bore 40. Extending through the bore 40 is a rotatively mounted shaft 41. Fixed to the shaft 41 at one side of the reduced end portion 36 is a bearing member 42 that engages one flat surface 37, while another bearing member 43 is pinned to shaft 41 and is adapted to engage the opposite flat surface 37 at the other side of the reduced end portion 36. With this structural arrangement, it will be realized that the shaft 41 can be rotated in either direction, but cannot be moved longitudinally axially through the bore 40. However, the pin 34 rotatively mounts the shaft 41 so that the shaft 41 can move in an arc about the pivot axis defined by pin 16.

A manipulating handle 44 is secured to one end of shaft 41, the handle 44 being located outwardly of the triangular frame for easy access. The handle 44 is conveniently utilized to rotate the shaft 41. The opposite end of the shaft 41 is provided with threads 45 shown in FIGS. 2 and 3 that engage the threaded bore 30 of the nut 27. Upon rotation of the shaft 41, the nut 27 will move longitudinally along the shaft, causing a rotation of the fulcrum member 17 and of the attached wheel 32. It will be seen that the nut 27 rotates in its mounting relative to the spaced plates 20 and 21 during the rotation of the fulcrum member 17, and that the threaded end of shaft 41 moves in an arc to accommodate the turning of the fulcrum member 17.

The top plate 11 of frame 10 is provided with a plurality (a total of three in the embodiment illustrated) of elongate relatively narrow guide slots 46 extending longitudinally in a direction toward and away from a common axis defined by pin 16. One of the elongate slots 46 extends toward each corner of the triangular frame 10.

Slidably disposed in each of the guide slots 46 is a key strip 47. Located on one side of the key strip 47 and below the top plate 11 of frame 10 is one bar 50, and located on the opposite side of the key strip 47 above the top plate 11 is a second bar 51. A plurality of bolts 52 secure the key strip 47, first bar 50 and second bar 51 together as a unit. This structure moves as a unit toward and away from the common axis of pin 16 as guided by the movement of strip 47 in guide slot 46.

The innermost end of each lower bar 50 is provided with a transverse slot 53 as is best illustrated in FIG. 10. The slot 53 cooperates with the other component parts of the mechanism to cause linear adjustment of the position of the unit structure 47–51 along the elongate slot 46 and relative to the common axis.

A jaw 54 is fixed to each upper bar 51 by a pair of bolts 55. Each upper bar 51 is provided with a series of regularly spaced tapped holes 56 adapted to receive the pair of bolts 55, and hence secure the jaw 54 in any one of a plurality of different positions along bar 51.

The jaw 54 is provided with serrations 57 along one face adapted to engage a work piece 60 incident to exerting an outward pressure. In addition, each jaw 54 is of a stepped construction to provide two separate serrated rear faces 61 and 62 adapted to engage work pieces 63 and 64 respectively incident to exerting an inward pressure.

The mechanism operatively interconnecting and transmitting pressure and motion between the wheel 32 and the bars 50 includes a plurality (a total of three in the embodiment shown) of cam plates 65. Each cam plate 65 includes a bearing sleeve portion 66 that is rotatively mounted on the pin 67 the opposite ends of which are fixed in the top plate 11 and an L-shaped bracket 70. Each cam plate 65 includes a pair of followers 71 and 72 provided by bearing pins press-fitted or otherwise secured to the cam plates.

The follower 71 of each cam plate 65 is received in one of the wheel recesses 33 while its cooperating follower 72 is received in the slot 53 of one of the bars 50. Upon rotation of wheel 32, the wheel engages the followers 71 to pivot the cam plates 65, the followers 71 moving along the recesses 33. As the cam plates 65 are turned, the followers 72 engage the bars 50 to move the jaws 54 in a linear direction toward or away from the common axis defined by pin 16. As the linear position of the jaws 54 is adjusted, the followers 72 slidably move in the transverse slots 53 of bars 50.

It is thought that the operation and functional advantages have become fully apparent from the foregoing detailed description of parts but for completeness of disclosure, the usage of the chuck will be briefly described.

It will be assumed that the jaws 54 are fixed to the upper bars 51 in the appropriate position to accommodate the particular size of the work piece involved. For example, it will be assumed that the jaws 54 are attached in the position illustrated in FIG. 4 so that the serrated faces 61 engage a work piece 63 that is located over the frame 10 between the jaws 54. With this arrangement, it is desired to exert an inward pressure on the work piece 63 to clamp the work piece 63 in place.

It will be assumed that the initial position of the component parts of the operating mechanism is disposed and located as is illustrated in FIG. 2. The operator turns the handle 44 in order to rotate the shaft 41. Upon shaft rotation, the nut 27 moves relatively axially along the threads 45 of shaft 41 in order to rotate the fulcrum member 17 counterclockwise from the position shown in FIG. 2 to the position illustrated in FIG. 3. To accomplish this result, it will be realized that the nut 27 rotates in its mounting on the spaced plates 20 and 21 and that the threaded end of shaft 41 swings in a small arc.

As the fulcrum member 17 is turned, the wheel 32 is simultaneously turned as a result of the rigid connection between the fulcrum member 17 and the wheel 32. The wheel 32 engages the followers 71 and consequently pivots the cam plates 65 in a clockwise direction from the position illustrated in FIG. 2 to the position illustrated in FIG. 3. To accommodate this movement, there may be a slight relative movement of the followers 71 along the wheel recesses 33.

As the cam plates 65 are pivoted, the followers 72 engage the bars 50 in the cooperating slots 53, and move the bars 50 and their attached appurtenances, namely, key strips 47, upper bars 51 and jaws 54 inwardly toward the common axis defined by the pin 16. The guide or key strips 47 acting in the elongate slots 46 constrain the movement of the jaws 54 to a straight line movement. To accommodate this action the followers 72 may slide or readjust their relative position in the transverse slots 53. As the jaws 54 are moved inwardly, the serrated faces 61 engage and exert pressure on the work piece 63.

It will be readily understood that this mechanism can be conveniently and advantageously utilized to exert tremendous pressure to the jaws 54 in either direction, that is toward or away from the common axis. The jaws 54 can be easily removed and attached to the upper bars 51 in order to accommodate the work pieces within a wide range of sizes.

Although the invention has been described by making detailed reference to a single preferred embodiment, such detail is to be understood in an instructive, rather than in any restrictive sense, many variants being possible within the scope of the claims hereunto appended.

I claim as my invention:

1. In a chuck mechanism:
   (a) a jaw reciprocatively mounted for movement toward or away from an axis,
   (b) a wheel rotatively mounted on said axis,
   (c) a fulcrum member attached to and rotatable with said wheel,
   (d) a nut rotatively mounted on said fulcrum member,
   (e) a shaft threadedly connected to said nut, the nut traveling longitudinally along said shaft upon shaft rotation so as to turn said fulcrum member and said wheel, and
   (f) means operatively interconnecting said wheel with said jaw for adjusting the position of said jaw in response to turning of said wheel.

2. In a chuck mechanism:
   (a) a frame,
   (b) a jaw reciprocatively mounted on said frame for movement toward or away from an axis,
   (c) a wheel rotatively mounted on said frame about said axis,
   (d) a fulcrum member attached to said wheel,
   (e) a nut rotatively mounted on said fulcrum member on an axis parallel to the wheel axis,
   (f) a shaft threadedly connected to said nut, the nut traveling longitudinally along said shaft upon shaft rotation so as to turn said fulcrum member and said wheel,
   (g) a bearing pivotally fixed to said frame on an axis parallel to the wheel axis and mounting said shaft to enable the shaft to swing in an arc upon turning of said fulcrum member, and
   (h) means operatively interconnecting said wheel with said jaw for adjusting the position of said jaw in response to turning of said wheel.

3. In a chuck mechanism:
   (a) a fixed frame,
   (b) a jaw reciprocatively mounted on the frame for movement toward or away from an axis,
   (c) a wheel rotatively mounted on said axis, said wheel being provided with a recess,
   (d) means for turning said wheel,
   (e) a cam plate pivotally mounted on the frame including a follower received in and movable along said wheel recess and bearing against the wheel to pivot said cam plate upon turning of said wheel, and
   (f) means operatively interconnecting the cam plate with said jaw for adjusting the position of said jaw in response to said pivotal movement of said cam plate.

4. In a chuck mechanism:
   (a) a fixed frame,
   (b) a bar mounted on the frame for reciprocative movement toward or away from an axis, said bar being provided with a transverse slot,
   (c) a jaw carried by said bar,
   (d) a rotative member mounted on said axis,
   (e) means for turning said rotative member,
   (f) a cam plate pivotally mounted to the fixed frame including a follower received in and movable along said bar slot and engaging said bar, and
   (g) means operatively interconnecting said rotative member with said cam plate for pivoting the cam plate upon rotation of said rotative member for adjusting the position of said bar and jaw.

5. In a chuck mechanism:
   (a) a fixed frame,
   (b) a wheel rotatively mounted on said frame on an axis, said wheel being provided with a recess,
   (c) a bar mounted for reciprocative movement toward or away from said axis, said bar being provided with a transverse slot,
   (d) a jaw secured to said bar and movable therewith, and
   (e) a cam plate pivotally mounted to the fixed frame including a follower received in and movable along said wheel recess and bearing against the wheel, and another follower received in and movable along said bar slot and engaging said bar, said wheel upon rotation pivoting the cam plate and adjusting the position and said jaw.

6. In a chuck mechanism:
   (a) frame,
   (b) a wheel member rotatively mounted to the frame on an axis, said wheel member being provided with a plurality of recesses,
   (c) a plurality of cam plates pivotally mounted to said frame, each said cam plate including a pair of followers, one of which is received in and movable along one of said wheel recesses and bears against the wheel member,
   (d) a plurality of jaws,
   (e) a bar reciprocatively mounting each jaw to said frame for movement toward or away from said axis, said bar being provided with a slot that receives the other said follower of one said cam plate, the said other follower being movable along the slot and bearing against the bar, and
   (f) means for turning said wheel to adjust the linear position of said jaws through the cam plate and bars.

7. In a chuck mechanism:
   (a) a frame,
   (b) a pin fixed to said frame to define an axis,
   (c) a fulcrum member rotatively mounted on said pin,
   (d) a wheel member rotatively mounted on said pin,
   (e) projections interconnecting said fulcrum member and said wheel member so as to be rotatable together, said wheel member being provided with a plurality of recesses,
   (f) a plurality of cam plates pivotally mounted to said frame, each said cam plate including a pair of followers, one of which is received in and movable along one of said recesses and bears against the wheel member,
   (g) a plurality of jaws,
   (h) a bar reciprocatively mounting each said jaw to said frame for movement toward or away from said common axis, said bar being provided with a slot that receives the other said follower of one of said cam plates, the said other follower being movable along the slot and bearing against the bar, (i) a nut rotatively mounted on said fulcrum member,
(j) a shaft threadedly connected to said nut, and
(k) a bearing pivotally fixed to said frame and mounting said shaft to enable the shaft to swing in an arc while turning the fulcrum member, the nut traveling longitudinally along said shaft upon shaft rotation so as to turn said fulcrum member and said wheel member and to adjust the linear position of said jaws through said cooperating said cam plates and bars.

References Cited in the file of this patent

UNITED STATES PATENTS

| 758,195 | Kraft | Apr. 26, 1904 |
| 1,321,739 | Haltman | Nov. 11, 1919 |
| 2,812,788 | Athmann | Nov. 12, 1957 |
| 2,948,314 | Bishman | Aug. 9, 1960 |

FOREIGN PATENTS

| 848,162 | Germany | Sept. 1, 1952 |